United States Patent [19]

Vancalbergh

[11] Patent Number: 4,653,371

[45] Date of Patent: Mar. 31, 1987

[54] WORK HOLDER FOR VERTICAL SAWS

[76] Inventor: James M. Vancalbergh, 540 S. Union St., Parma, Mich. 49269

[21] Appl. No.: 768,441

[22] Filed: Aug. 22, 1985

[51] Int. Cl.⁴ .............................................. B26D 7/02
[52] U.S. Cl. ...................................... 83/464; 83/799; 83/762; 269/87.2; 269/295; 269/303
[58] Field of Search ............... 269/41, 87.2, 295, 204, 269/303, 304, 315; 83/794, 796, 454, 466.1, 802, 761–765, 464, 799

[56] References Cited

U.S. PATENT DOCUMENTS

| 918,248 | 4/1909 | Wysong . | |
|---|---|---|---|
| 1,152,696 | 9/1915 | Berry . | |
| 2,253,515 | 8/1941 | Grob et al. . | |
| 3,850,422 | 11/1974 | Kwas | 269/204 |
| 3,866,897 | 2/1975 | Whalen | 269/87.2 |
| 3,913,436 | 10/1975 | Orescan . | |
| 4,056,030 | 11/1977 | Hahn | 83/762 |
| 4,096,777 | 6/1978 | Adams | 83/762 |
| 4,111,409 | 9/1978 | Smith | 269/304 |
| 4,125,251 | 11/1978 | Jamieson | 269/900 |
| 4,350,066 | 9/1982 | Volk | 269/295 |

Primary Examiner—Robert C. Watson
Attorney, Agent, or Firm—Beaman & Beaman

[57] ABSTRACT

A work holder for vertical band saws wherein a moving blade is laterally translated through a work table slot. The work holder includes a fixed reference member mounted on the table transversely disposed to the table slot and intersected by the blade. A clamp mounted upon the work table in alignment with the slot bridges the slot and saw blade path of movement holding the workpiece against the reference member permitting firm retention of the workpiece adjacent the blade to permit small pieces to be accurately severed.

5 Claims, 5 Drawing Figures

WORK HOLDER FOR VERTICAL SAWS

BACKGROUND OF THE INVENTION

Work holders for holding a workpiece while the same is being sawed by a band saw, or the like, are usually in the form of a vise having opposed jaws relatively movable toward each other for gripping the workpiece. The jaws are usually operated by a threaded shaft, pivoted linkage, expansible chamber motor, or other known actuators, and often, one jaw will be fixed with respect to the saw frame or mechanism, while the other jaw is movable theretoward.

Conventionally, work holders used in conjunction with band saws, and the like, are mounted to one side of the path of saw blade movement Thus, when sawing a rod or shaft, for instance, the rod would be mcunted within the work holder jaws and the portion to be severed would extend in a cantilever manner into the blade path of movement Such an arrangement only provides firm support of the workpiece on one side of the blade and a symmetrical retention of the workpiece with respect to the blade is not present. The asymmetrical holding forces imposed on the workpiece during sawing make it very difficult to maintain close tolerances, particularly when sawing thin sections from a rod, shaft, or the like. Further, as the workpiece is gripped at a location laterally removed from the saw blade, the work will often deform which, in turn, may deflect the blade from its predetermined direction of movement.

It is an object of the invention to provide a work holder for use with a saw wherein the saw blade is horizontally laterally displaced through a work table wherein the work holder produces symmetrical work holding forces on the workpiece with respect to the saw blade during sawing.

Another object of the invention is to provide a work holder for a vertical band saw wherein the work holder is mounted upon the horizontal saw table and symmetrically engages and clamps the workpiece relative to the saw blade and its direction of movement.

Yet another object of the invention is to provide a work holder for a vertical band saw having a horizontal work table wherein the saw blade is fed through a table slot, a reference member mounted upon the table intersected by the slot and blade positions the workpiece relative to the blade, and a clamp mounted upon the table includes a clamp head forcing the workpiece against the reference member, the clamp head engaging the workpiece on each side thereof with respect to the direction of blade movement.

An additional object of the invention is to provide a work holder for vertical band saws and the like wherein the workpiece is symmetrically supported relative to the direction of blade movement and close sawing tolerances may be consistently achieved.

The concepts of the invention are best practiced with a vertical band saw having a gravity feed of the band saw blade, although it is appreciated that the concepts can be incorporated into similar apparatus wherein a blade is advanced into a workpiece supported upon a table.

In a vertical gravity feed band saw the saw includes a horizontal table having a slot defined therein. The band saw blade is mounted upon a carriage which is inclined to the vertical which permits the blade to be fed, by gravity, through the slot into a workpiece mounted upon the saw table. Normally, the table includes a stop or abutment in alignment with the slot, and the downwardly moving portion of the blade is fed laterally in a horizontal direction through the table slot toward the workpiece resting or clamped against the abutment. The blade engages the workpiece and is fed therein by gravity forces acting on the blade carriage, and during sawing no relative movement takes place between the workpiece and work table.

In the practice of the invention an elongated reference member or fence is mounted on the work table with its length perpendicular to the blade receiving slot defined in the table. The reference member is defined by two aligned portions located on opposite sides of the slot separated by a distance only slightly greater than the blade thickness. The reference member includes a vertically oriented face against which the workpiece is clamped, and measurement indicia is preferably defined on this face. Also, an adjustable workpiece stop is associated with the reference member to facilitate sawing of predetermined lengths without independent measurement.

A clamp support is bolted to the work table in alignment with the table slot, and a clamp head is supported by the clamp support upon an elongated rod for adjustment toward and away from the reference member. Preferably, the rod is in alignment with the table slot, and the clamp head is mounted on the rod outer end.

The clamp head is slidably supported upon the work table by a friction reducing pad, and the head includes a face in opposed relationship to the reference member face. The clamp head is of sufficient horizontal width in a direction transverse to the table slot wherein the head face "bridges" the table slot, substantially equal portions of the head being located upon each side of the slot.

The workpiece is placed upon the work table adjacent the reference member, and the clamp head is brought against the workpiece to force the workpiece against the reference member and thereby rigidly clamp the workpiece upon the table. A lock defined on the clamp support locks the position of the rod and clamp head relative to the clamp support, and in this manner, the workpiece is firmly held upon the work table between the reference member and the clamp head. The saw blade is then permitted to pass through the reference member and engage the workpiece, and the saw will feed into the workpiece. Movement of the saw blade is continued until the blade engages the clamp head, and at that time, the workpiece will have been severed and the direction of the movement of the blade is reversed to withdraw the blade from the table slot.

As the clamp head bridges the table slot, such that the clamp head face is located upon both sides of the blade during sawing, there is no tendency for the workpiece to "tilt" with respect to the direction of the movement of the blade, and symmetrical holding forces on the workpiece are produced with respect to the blade and the forces imposed on the workpiece by the blade. Thus, with the work holder of the invention there is no tendency for the workpiece to tilt or cock with respect to the direction of blade movement and very accurate sawing tolerances can be consistently achieved.

BRIEF DESCRIPTION OF THE PREFERRED DRAWINGS

The aforementioned objects and advantages of the invention will be appreciated from the following description and accompanying drawings wherein:

FIG. 1 is a perspective view of a vertical gravity feed band saw utilizing the work holding apparatus of the invention, FIG. 2 is an enlarged perspective view of the saw table and work holder apparatus, FIG. 3 is a top plan view of the saw work table with a workpiece being clamped in position, FIG. 4 is a front elevational view, partially sectional, of the face of the reference member, the clamp structure not being shown, and FIG. 5 is an elevational side view of the reference member, work table, and clamp head as taken from the left of FIG. 3.

DESCRIPTION OF THE PREFERRED EMBODIMENT

Figure 1:
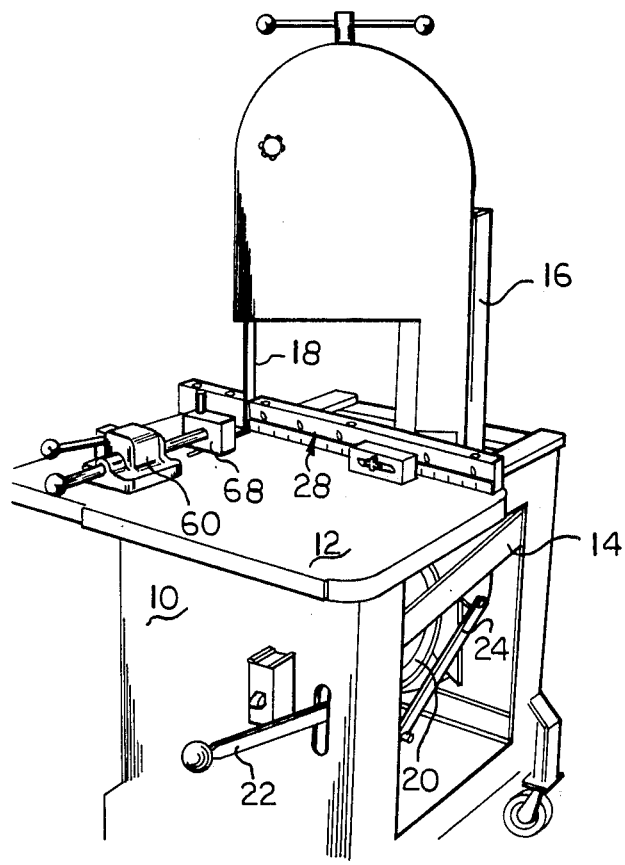
Figure 2:
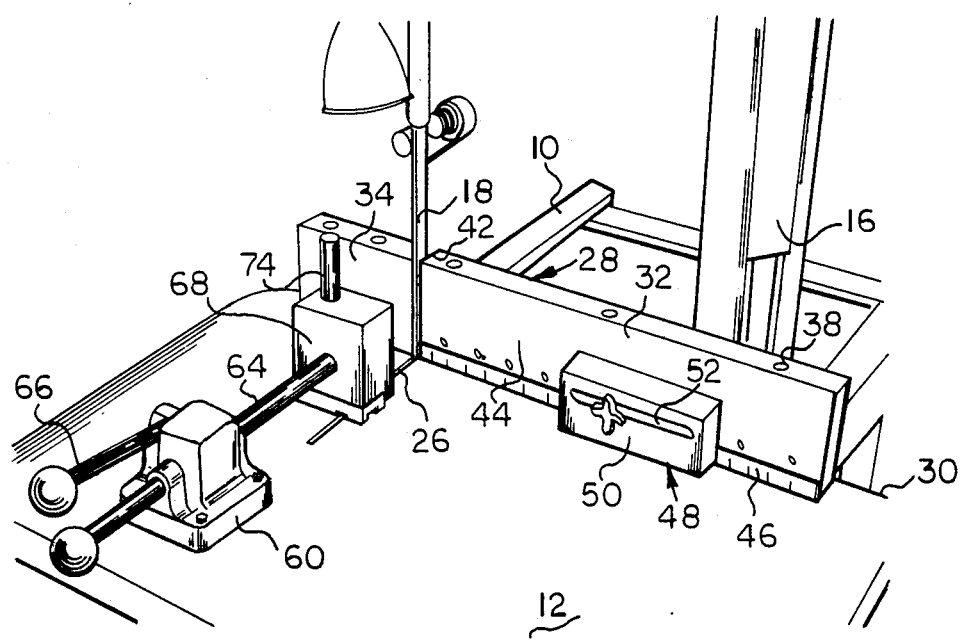
Figure 3:
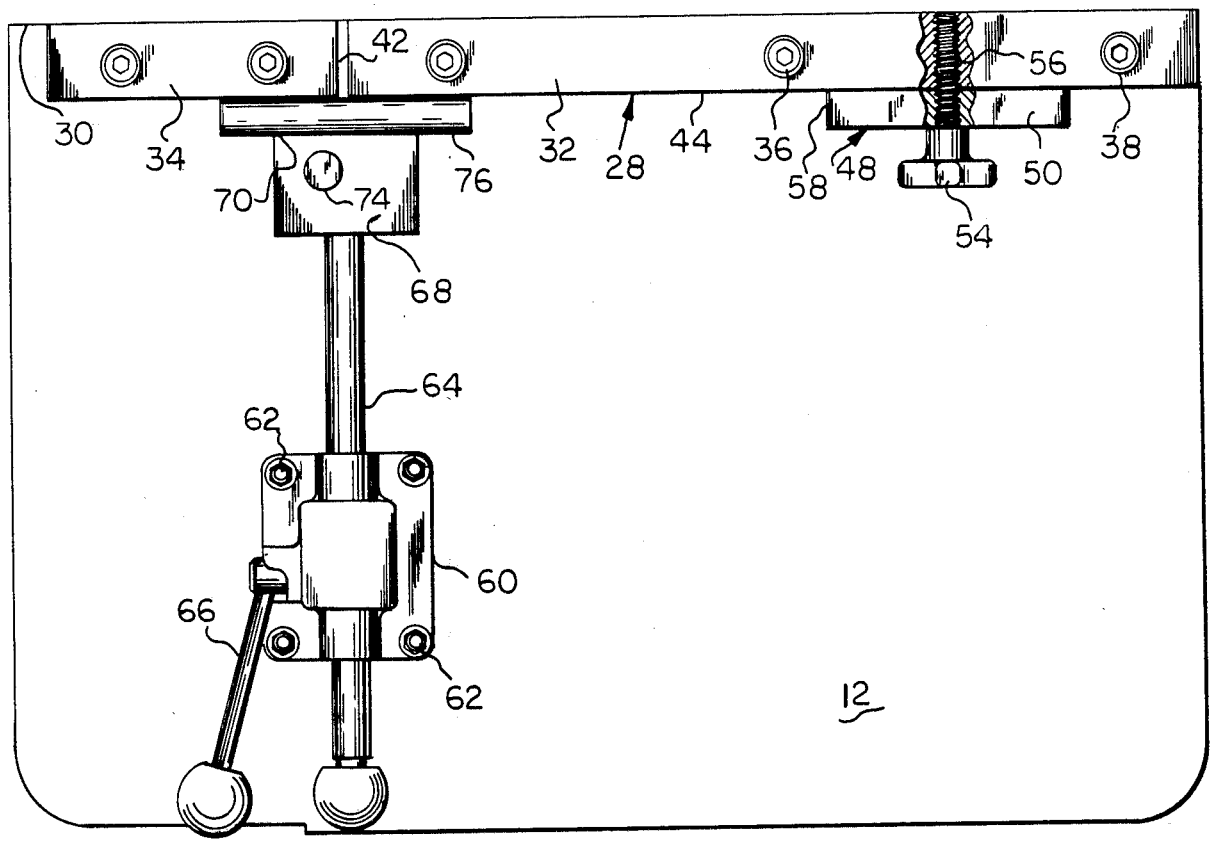
Figure 4:
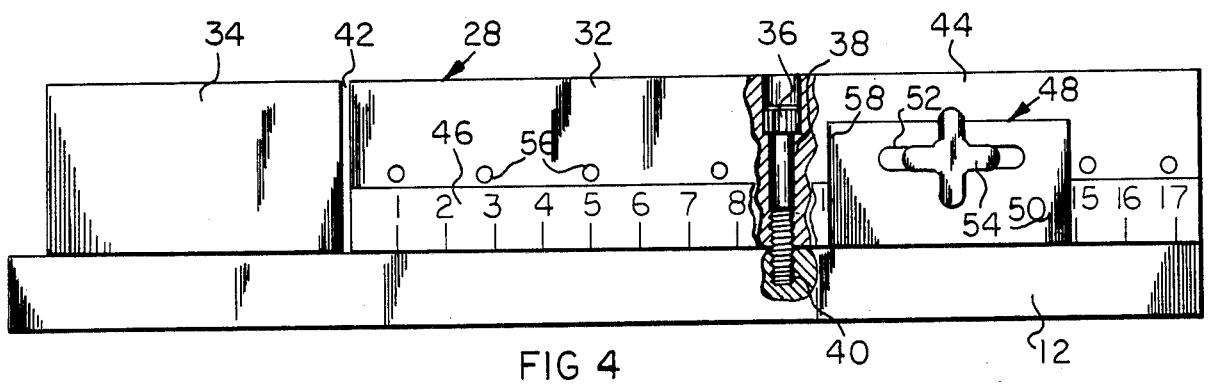
Figure 5:
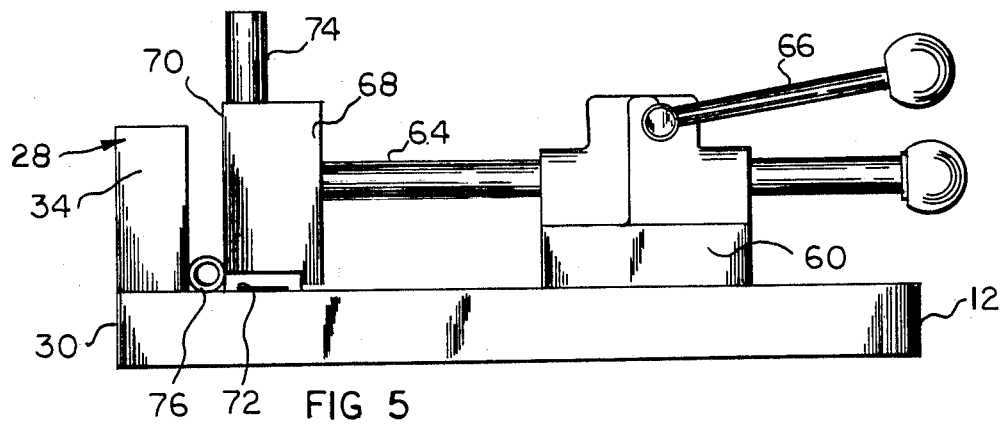

A vertical gravity feed band saw consists of a frame 10, FIG. 1, upon which a horizontally disposed work table 12 is supported. The apparatus includes carriage rails 14 obliquely disposed to the horizontal upon which the saw blade carriage, generally indicated at 16, is movably mounted upon rollers, not shown. The carriage 16 includes upper and lower blade supporting wheels or rollers upon which the blade 18 is mounted, and a motor, not shown, drives the lower blade wheel 20 to pull the cutting portion of the blade downward. Operation of the carriage 16 is by the lever 22 mounted upon the frame whereby, through a suitable linkage 24, lowering of the lever retracts the carriage 16 upon the guide rails 14 rearwardly to the nonsawing position, while raising the lever 22 permits the carriage to come forward under control of lever movement, and release of the lever permits the carriage to continue its forward movement under gravity forces.

The work table 12 includes a linear slot 26 intersecting the rear edge of the work table which the blade 18 enters during cutting, wherein a workpiece located upon the work table extending across the slot will be engaged by the blade, and in the usual use of this type of saw, a backup plate, or abutment, not shown, is mounted upon the work table in alignment with the slot for engagement of the workpiece to hold the workpiece during sawing. The aforementioned type of gravity feed band saw is commercially available, and one source of manufacturer is Roll In Saw, Inc. of Parma, Michigan.

The work holder of the invention includes an elongated reference member 28 which is mounted upon the work table 12 adjacent its rear edge 30. The reference member 28 consists of block portions 32 and 34 which are aligned lengthwise and are firmly mounted upon the work table 12 by bolts 36 located within vertical holes 38 in the reference member portions, and threaded into threaded holes 40 in the work table. A slot 42 is defined in the reference member 28 by the opposed inner ends of the block portions 32 and 34 which coincides and is aligned with the work table blade slot 26, and in this manner the blade 18 is able to pass through the reference member.

The reference member includes a face 44 perpendicularly disposed to the plane of the work table, and as the length of the reference member 28 is perpendicular to the blade slot 26 the face 44 will, likewise, be perpendicular to the blade slot. Preferably, a measurement indicia scale 46 is mounted on the face 44, have a zero reference at slot 42 and a stop 48 is adjustably attached to the reference member block portion 32 for preselected adjustment along the reference member.

The stop 48 comprises a block 50 having an elongated slot 52 defined therein, and a thumb screw 54 extends through the slot for selective engagement with a horizontal threaded hole 56, a plurality of which are evenly spaced along the reference member 28. The end 58 of the block 50 defines the reference surface of the block and by preselecting the hole 56 into which the thumb screw 54 is threaded, the stop block 50 may be positioned as desired along the reference member and indicia scale 46 at a distance from the blade slot 42 to permit sawing of the workpiece at a predetermined location. The use of the stop block 50 permits a plurality of workpieces to be sawn to identical lengths as they are positioned by end 58.

Clamping of the workpiece against the reference member 28 is accomplished by the clamping structure which includes a clamp support 60 bolted to the work table 12 by a plurality of bolts 62 threaded into threaded holes formed in the work table. The clamp support 60 is in alignment with the table blade slot 26, and includes a bore axially slidably receiving the cylindrical rod 64. An actuating and locking lever 66 mounted upon the support 60 is positionable to slightly translate the rod 64 toward the reference member 28, and lock the rod in an axial position. The clamp support 60 may be of a commercially available form such as manufactured by Heinrich Tools, Inc. of Racine, Wisc,, Model SFL.

A clamp head 68 is attached to the end of the rod 64 and, in the disclosed embodiment, consists of a block having a flat face 70 in opposed parallel relation to the reference member face 44 perpendicular to the blade slot and substantially equally "bridges" the blade slot 26. As will be appreciated from the drawings, the rod 64 is in alignment with the blade slot 26, and the clamp head 68 is symmetrically mounted upon the rod.

The clamp head 68 slides along the work table 12 during adjustment and, preferably, a synthetic polymer wear plate 72 is attached to the lower portion of the clamp head to aid in adjustment of the head and improve the operation and movement thereof and protect the table. A handle 74 extends upwardly from the clamp head which may be manually grasped by the operator to adjust the clamp head with respect to the workpiece and the reference member.

In use, the lock lever 66 is rotated to the non-locking position, and the workpiece 76 to be sawed is placed upon the work table 12 against the reference member face 44. If the stop block 50 is being utilized, the stop block will previously be adjusted along the face 44 as desired, and the end of the workpiece brought into engagement with the stop block end 58 so that the cut will be accurately determined.

After the workpiece 76 is positioned as desired relative to the reference member 28, the clamp head 68 is brought against the workpiece by grasping the clamp handle 74, and the lock lever 66 pivoted to a lock position which slightly translates rod 64 toward the workpiece and locks the rod firmly holding the workpiece against the reference member portions 32 and 34.

The lever 22 is then raised slowly to permit the carriage 16 to move the saw blade 18 toward the work table and between the slot 42 defined by the reference member block portions, and into the engagement with the workpiece 76. Thereupon, feeding of the blade 18 into the workpiece is permitted by gravitational force. Sawing continues until the blade engages the clamp head face 70, at which time the workpiece will have been severed and lever 22 is depressed to retract the blade.

As the clamp head face 70 firmly engages the workpiece 76 on each side of the blade 18 and blade slots 26 and 42 during sawing, the workpiece is firmly supported against the pressure exerted thereon by the feeding of the blade and no asymmetrical forces are imposed on the workpiece during sawing. Thus, the blade will run true during the sawing and very accurate tolerances can be achieved. Apparatus of the disclosed type is capable of sawing a rod of very short length, such as 1", into a number of segments wherein the cut will be perpendicular to the rod axis, and the sawing of such short pieces is not possible with known band saw work holders.

It is appreciated that various modifications to the inventive concepts may be apparent to those skilled in the art without departing from the spirit and scope of the invention.

I claim:

1. A saw comprising, in combination, a frame, a substantially flat table mounted on said frame having an edge, an elongated table slot defined in said table intersecting said edge, a saw blade, gravity operated saw blade support means mounted on said frame supporting said saw blade for selectively moving said saw blade through said table slot, an elongated reference member fixed to said table adjacent said table edge extending substantially perpendicular to said table slot and comprising first and second aligned elongated portions disposed on opposite sides of said table slot in close proximity thereto whereby said saw blade moves through said reference member when moving through said table slot, a clamp support mounted upon said table spaced from said reference member, and a clamp head mounted on said clamp support in alignment with said table slot and movable in the direction of the length of said table slot toward and away from said reference member, said clamp head straddling said table slot and adapted to clamp a workpiece against said reference member in alignment with said table slot.

2. In a saw as in claim 1, said clamp head having a face firmly engaging the workpiece on each side of said table slot.

3. In a saw as in claim 2, said clamp support including a lock, said lock locking said clamp head in predetermined relationship to said reference member.

4. In a saw as in claim 2, bolts affixing said clamp support to said table, an elongated rod axially slidably mounted upon said clamp support in alignment with said table slot, a lock defined on said clamp support locking said rod with respect to said clamp support, said clamp head being mounted upon said rod.

5. In a saw as in claim 1, said reference member including a workpiece engaging face disposed toward said clamp support, an indicia measurement scale defined upon said face, a stop mounted upon said face and means adjustably mounting said stop on said face comprising a slot defined in said stop substantially parallel to said reference member, and a releasable fastener extending through said stop slot attached to said reference member frictionally holding said stop against said reference member.

* * * * *